(12) United States Patent
Lee et al.

(10) Patent No.: US 12,437,525 B2
(45) Date of Patent: Oct. 7, 2025

(54) METHOD AND APPARATUS WITH SELF-ATTENTION-BASED IMAGE RECOGNITION

(71) Applicant: SAMSUNG ELECTRONICS CO., LTD., Suwon-si (KR)

(72) Inventors: Seohyung Lee, Yongin-si (KR); Dongwook Lee, Suwon-si (KR); Changbeom Park, Seoul (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 17/720,681

(22) Filed: Apr. 14, 2022

(65) Prior Publication Data

US 2023/0154171 A1 May 18, 2023

(30) Foreign Application Priority Data

Nov. 12, 2021 (KR) ........................ 10-2021-0155779

(51) Int. Cl.
*G06V 10/82* (2022.01)
*G06N 3/08* (2023.01)
*G06V 10/40* (2022.01)

(52) U.S. Cl.
CPC ............... *G06V 10/82* (2022.01); *G06N 3/08* (2013.01); *G06V 10/40* (2022.01)

(58) Field of Classification Search
CPC .......... G06N 3/0464; G06N 3/08; G06N 3/04; G06N 3/044; G06N 3/045; G06N 3/048;
(Continued)

(56) References Cited

U.S. PATENT DOCUMENTS 1,089,556 A 3/1914 Helfrich
10,089,556 B1 10/2018 Xu
(Continued)

FOREIGN PATENT DOCUMENTS

CN 113536990 A * 10/2021
KR 10-2020-0129198 A 11/2020
(Continued)

OTHER PUBLICATIONS

Vaswani, A. "Attention is all you need." Advances in Neural Information Processing Systems (2017). (Year: 2017).*
(Continued)

*Primary Examiner* — Sumati Lefkowitz
*Assistant Examiner* — Aaron Joseph Sorrin
(74) *Attorney, Agent, or Firm* — NSIP Law

(57) ABSTRACT

A method with self-attention includes: obtaining a three-dimensional (3D) feature map; generating 3D query data and 3D key data by performing a convolution operation based on
(Continued)

the 3D feature map; generating two-dimensional (2D) vertical data based on a vertical projection of the 3D query data and the 3D key data; generating 2D horizontal data based on a horizontal projection of the 3D query data and the 3D key data; determining an intermediate attention result through a multiplication based on the 2D vertical data and the 2D horizontal data; and determining a final attention result through a multiplication based on the intermediate attention result and the 3D feature map.

25 Claims, 11 Drawing Sheets

(58) Field of Classification Search
CPC ........ G06N 3/063; G06N 3/084; G06V 20/41; G06V 10/87; G06V 10/764; G06V 10/40; G06V 10/82; G06V 20/64; G06F 18/213
See application file for complete search history.

(56) References Cited

U.S. PATENT DOCUMENTS

| | | |
|---|---|---|
| 2019/0122103 A1 | 4/2019 | Gao et al. |
| 2019/0354567 A1 | 11/2019 | Dehghani et al. |
| 2020/0356842 A1 | 11/2020 | Guo et al. |
| 2023/0359865 A1* | 11/2023 | Shen ...................... G06N 3/045 |

FOREIGN PATENT DOCUMENTS

| | | |
|---|---|---|
| KR | 10-2021-0071471 A | 6/2021 |
| WO | WO 2018/217948 A1 | 11/2018 |
| WO | WO 2020/257812 A2 | 12/2020 |
| WO | WO 2021/093960 A1 | 5/2021 |

OTHER PUBLICATIONS

Mehta, Sachin, and Mohammad Rastegari. "Mobilevit: lightweight, general-purpose, and mobile-friendly vision transformer." arXiv preprint arXiv:2110.02178 (2021). (Year: 2021).*
Zhou, Daquan, et al. "Refiner: Refining self-attention for vision transformers." arXiv preprint arXiv:2106.03714 (2021). (Year: 2021).*
English Translation: CN-113536990-A (Year: 2021).*
Zhou, Zhen, et al. "Self-Attention Feature Fusion Network for Semantic Segmentation." *Neurocomputing Volume 453 PII:S0925-2312(21)00664-0 Reference: NEUCOM 23799* Mar. 17, 2021 (10 pages in English).
Huang, Zilong, et al., "CCNet: Criss-Cross Attention for Semantic Segmentation", Proceedings of the IEEE/CVF International Conference on Computer Vision, 2019, (10 Pages in English).
Hou, Qibin, et al., "Coordinate Attention for Efficient Mobile Network Design", Proceedings of the IEEE/CVF Conference on Computer Vision and Pattern Recognition, 2021, (10 Pages in English).
Korean Office Action Issued on Aug. 13, 2025, in Counterpart Korean Patent Application No. 10-2021-0155779 (10 Pages in English, 10 Pages in Korean).

* cited by examiner

METHOD AND APPARATUS WITH SELF-ATTENTION-BASED IMAGE RECOGNITION

CROSS-REFERENCE TO RELATED APPLICATIONS

This application claims the benefit under 35 USC § 119(a) of Korean Patent Application No. 10-2021-0155779, filed on Nov. 12, 2021 in the Korean Intellectual Property Office, the entire disclosure of which is incorporated herein by reference for all purposes.

BACKGROUND

1. Field

The following description relates to a method and apparatus with self-attention-based image recognition.

2. Description of Related Art

Technical automation of recognition may be implemented through a neural network model implemented by a processor of a special structure for computation, and may provide computationally intuitive mappings between input patterns and output patterns after a considerable amount of training. The trained capability of generating such mappings may be referred to as a learning capability of the neural network. Further, because of the specialized training, the neural network trained for such a special purpose may thereby have a generalization capability of generating a relatively accurate output with respect to an input pattern that the neural network may not have been trained for, for example.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a method with self-attention includes: obtaining a three-dimensional (3D) feature map; generating 3D query data and 3D key data by performing a convolution operation based on the 3D feature map; generating two-dimensional (2D) vertical data based on a vertical projection of the 3D query data and the 3D key data; generating 2D horizontal data based on a horizontal projection of the 3D query data and the 3D key data; determining an intermediate attention result through a multiplication based on the 2D vertical data and the 2D horizontal data; and determining a final attention result through a multiplication based on the intermediate attention result and the 3D feature map.

The 3D feature map, the 3D query data, and the 3D key data may each be represented by a channel dimension, a height dimension, and a width dimension, the 2D vertical data may be represented by the channel dimension and the height dimension without the width dimension, and the 2D horizontal data may be represented by the channel dimension and the width dimension without the height dimension.

The vertical projection may average data of the width dimension, and the horizontal projection may average data of the height dimension.

The generating of the 3D query data and the 3D key data may include: generating the 3D query data through a convolution operation based on the 3D feature map and a first weight kernel; and generating the 3D key data through a convolution operation based on the 3D feature map and a second weight kernel.

The generating of the 2D vertical data may include: generating 2D vertical query data by performing a vertical projection on the 3D query data; generating 2D vertical key data by performing a vertical projection on the 3D key data; determining a multiplication result by performing a multiplication based on the 2D vertical query data and the 2D vertical key data; and generating the 2D vertical data by performing a projection on the multiplication result.

The generating of the 2D horizontal data may include: generating 2D horizontal query data by performing a horizontal projection on the 3D query data; generating 2D horizontal key data by performing a horizontal projection on the 3D key data; determining a multiplication result by performing a multiplication based on the 2D horizontal query data and the 2D horizontal key data; and generating the 2D horizontal data by performing a projection on the multiplication result.

The 3D feature map used for determining the final attention result may correspond to 3D value data.

The determining of the final attention result may include: performing a normalization on the intermediate attention result; and determining the final attention result through a multiplication based on a result of the normalization and the 3D feature map.

The normalization on the intermediate attention result may be performed based on a softmax operation.

The multiplication based on the 2D vertical data and the 2D horizontal data may be a matrix multiplication, and the multiplication based on the intermediate attention result and the 3D feature map may be a pixelwise multiplication.

The obtaining of the 3D feature map, the generating of the 3D query data and the 3D key data, the generating of the 2D vertical data, the generating of the 2D horizontal data, the determining of the intermediate attention result, and the determining of the final attention result may be performed for a self-attention block of a neural network-based image recognition model.

The 3D feature map may correspond to either one of an input image of the image recognition model and output data of a convolution layer of the image recognition model.

A recognition result of the image recognition model may be determined based on the final attention result.

The method may include: generating the 3D feature map by performing a convolution operation for a neural network-based image recognition model; and determining a recognition result of the image recognition model by applying the final attention result to the 3D feature map.

In another general aspect, a method with image recognition includes: generating a three-dimensional (3D) feature map by performing a convolution operation for a first convolution layer of a neural network-based image recognition model; determining a self-attention result by performing self-attention based on the 3D feature map for a self-attention block of the image recognition model; and determining a recognition result of the image recognition model by applying the self-attention result to the 3D feature map, wherein the determining of the self-attention result may include: generating 3D query data and 3D key data by performing a convolution operation on the 3D feature map; generating two-dimensional (2D) vertical data based on a vertical projection of the 3D query data and the 3D key data;

generating 2D horizontal data based on a horizontal projection of the 3D query data and the 3D key data; determining an intermediate attention result through a multiplication based on the 2D vertical data and the 2D horizontal data; and determining a final attention result through a multiplication based on the intermediate attention result and the 3D feature map.

The 3D feature map, the 3D query data, the 3D key data may each be represented by a channel dimension, a height dimension, and a width dimension, the 2D vertical data may be represented by the channel dimension and the height dimension without the width dimension, and the 2D horizontal data may be represented by the channel dimension and the width dimension without the height dimension.

The generating of the 3D query data and the 3D key data may include: generating the 3D query data through a convolution operation based on the 3D feature map and a first weight kernel; and generating the 3D key data through a convolution operation based on the 3D feature map and a second weight kernel.

The generating of the 2D vertical data may include: generating 2D vertical query data by performing a vertical projection on the 3D query data; generating 2D vertical key data by performing a vertical projection on the 3D key data; determining a multiplication result by performing a multiplication based on the 2D query data and the 2D key data; and generating the 2D vertical data by performing a projection on the multiplication result.

In another general aspect, one or more embodiments include a non-transitory computer-readable storage medium storing instructions that, when executed by a processor, configure the processor to perform any one, any combination, or all operations and methods described herein.

In another general aspect, an electronic device includes: a processor configured to: obtain a three-dimensional (3D) feature map; generate 3D query data and 3D key data by performing a convolution operation based on the 3D feature map; generate two-dimensional (2D) vertical data based on a vertical projection of the 3D query data and the 3D key data; generate 2D horizontal data based on a horizontal projection of the 3D query data and the 3D key data; determine an intermediate attention result through a multiplication based on the 2D vertical data and the 2D horizontal data; and determine a final attention result through a multiplication based on the intermediate attention result and the 3D feature map.

The 3D feature map, the 3D query data, and the 3D key data may each be represented by a channel dimension, a height dimension, and a width dimension, the 2D vertical data may be represented by the channel dimension and the height dimension without the width dimension, and the 2D horizontal data may be represented by the channel dimension and the width dimension without the height dimension.

The electronic device may include a memory storing instructions that, when executed by the processor, configure the processor to perform the obtaining of the 3D feature map, the generating of the 3D query data and the 3D key data, the generating of the 2D vertical data, the generating of the 2D horizontal data, the determining of the intermediate attention result, and the determining of the final attention result.

In another general aspect, a method with self-attention includes: generating three-dimensional (3D) query data and 3D key data by performing a convolution operation based on a 3D feature map; generating first two-dimensional (2D) data based on averages of the 3D query data and the 3D key data in a first dimension direction; generating second 2D data based on averages of the 3D query data and the 3D key data in a second dimension direction; and determining a final attention result based on the first 2D data and the second 2D data.

The first 2D data may include a projection of the 3D query data and the 3D key data in a direction of any one of a channel, a height, and a width, and the first dimension direction may be a direction of any other one of the channel, the height, and the width.

The final attention result may be 3D and may have a same size as the 3D feature map.

Other features and aspects will be apparent from the following detailed description, the drawings, and the claims.

Figure 1A:
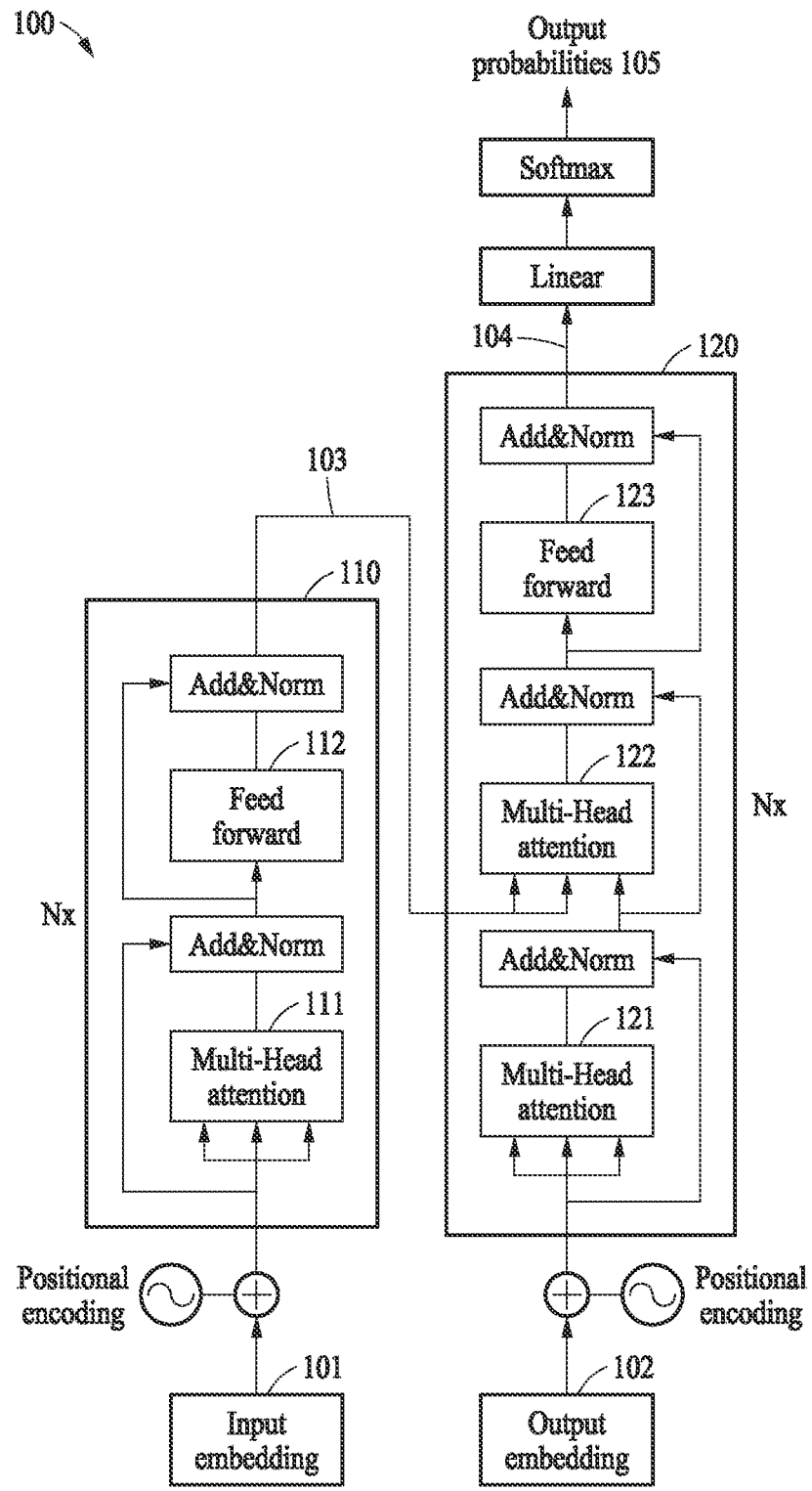
FIGS. 1A through 1C illustrate an example of a configuration of a transformer for natural language processing.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1B:
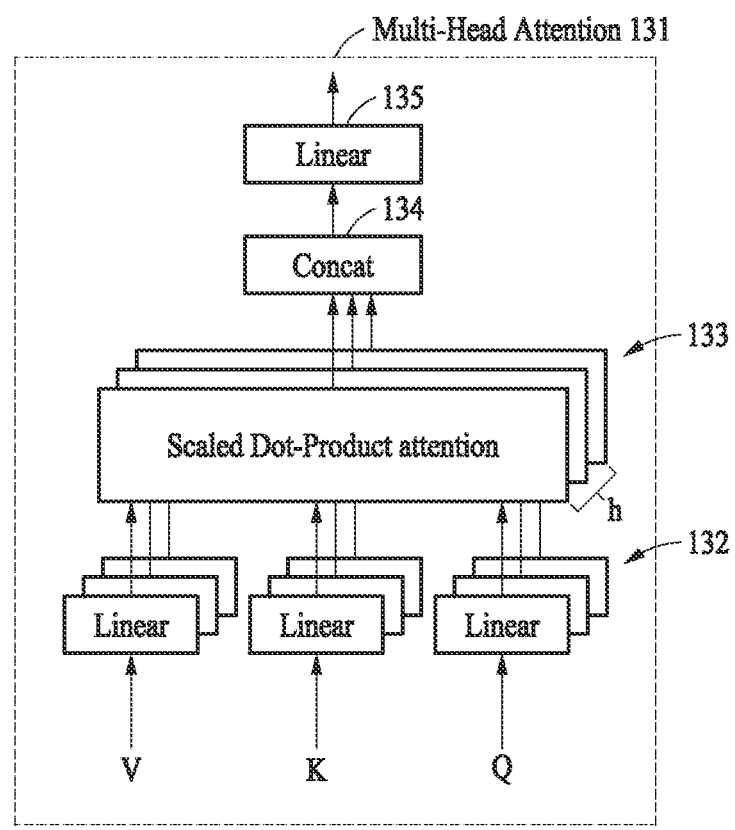
Figure 1C:
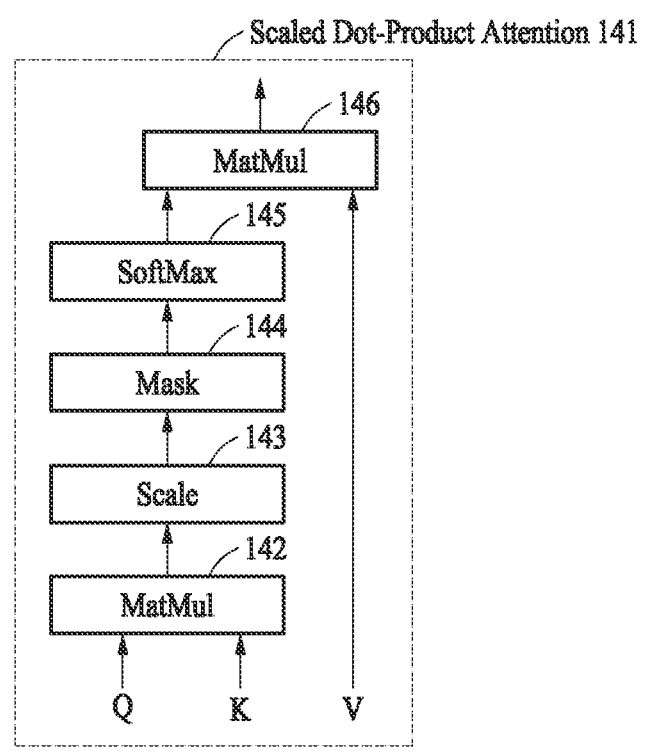

FIGS. 1A through 1C illustrate an example of a configuration of a transformer for natural language processing. When processing sequence data such as a natural language, there may be an issue of long-term dependency. A transformer model 100 may be used to solve such an issue of long-term dependency through self-attention.

Referring to FIG. 1A, the transformer model 100 may include N encoders 110 and N decoders 120. The transformer model 100 may stress a value highly associated with a query through self-attention between tokens. Each of multi-head attention blocks 111, 121, and 122 of the transformer model 100 may perform self-attention on embedding. Embedding may refer to a result of changing a natural language used by humans into the form of a vector that may be understood by machines, or a series of processes of the changing.

The multi-head attention block 111 may perform self-attention on input embedding 101, and the multi-head attention block 121 may perform self-attention on output embedding 102. In this case, self-attention may be performed on a result of positional encoding on each of the input embedding 101 and the output embedding 102. The multi-head attention block 121 may use an attention mask. The multi-head attention block 122 may perform self-attention on an encoder output 103.

Feedforward blocks 112 and 123 may perform a neural network operation based on respective attention results. For example, the feedforward blocks 112 and 123 may each include a fully-connected layer. In addition, the encoders 110 and the decoders 120 may further perform an addition and a normalization, and the transformer model 100 may further perform a linear operation (e.g., a matrix multiplication) and a softmax operation based on a decoder output 104. As a result, output probabilities 105 for sequence data may be generated.

Referring to FIG. 1B, a multi-head attention block 131 may correspond to the multi-head attention blocks 111, 121, and 122 of FIG. 1A. The multi-head attention block 131 may reduce a dimension of each of a value V, a key K, and a query Q through linear operation blocks 132, perform self-attention through h scaled dot-product attention blocks 134, and perform concatenation 134 and a linear operation 135 on an attention result.

Referring to FIG. 1C, a scaled dot-product attention block 141 may correspond to the scaled dot-product attention blocks 133 of FIG. 1B. A matrix multiplication block 142 and a scaling block 143 may compare a query Q and a key K. The matrix multiplication block 142 may perform dot-product or inner product. A mask block 144 may prevent an erroneously connected attention through a mask. When the mask block 144 is defined, the multi-head attention block 121 of FIG. 1A may use an attention mask. A matrix multiplication block 146 may generate an attention value by combining a value V and a similarity which is an output from a softmax operation block 145.

Figure 2A:
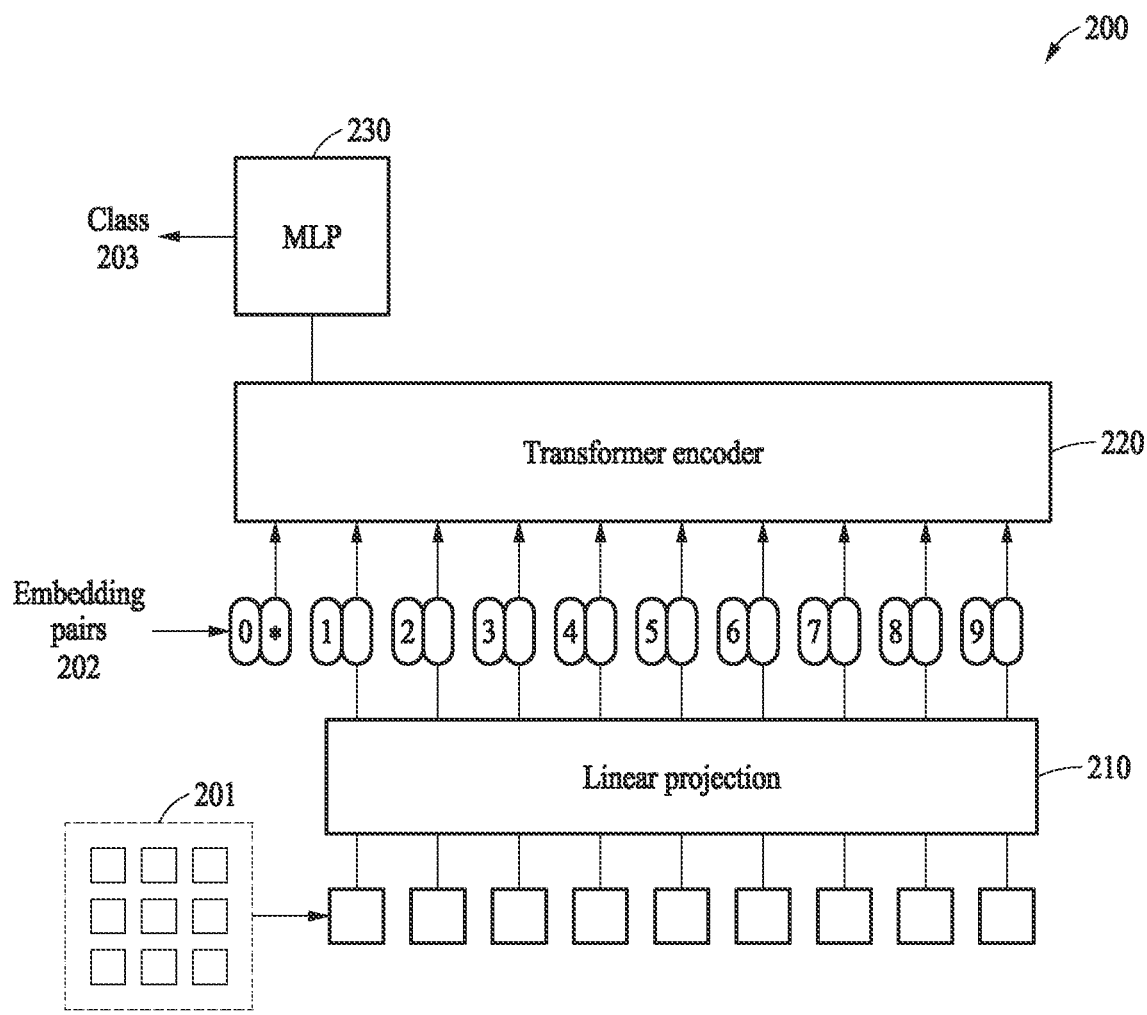
FIGS. 2A and 2B illustrate an example of a configuration of a transformer for image recognition.
Figure 2B:
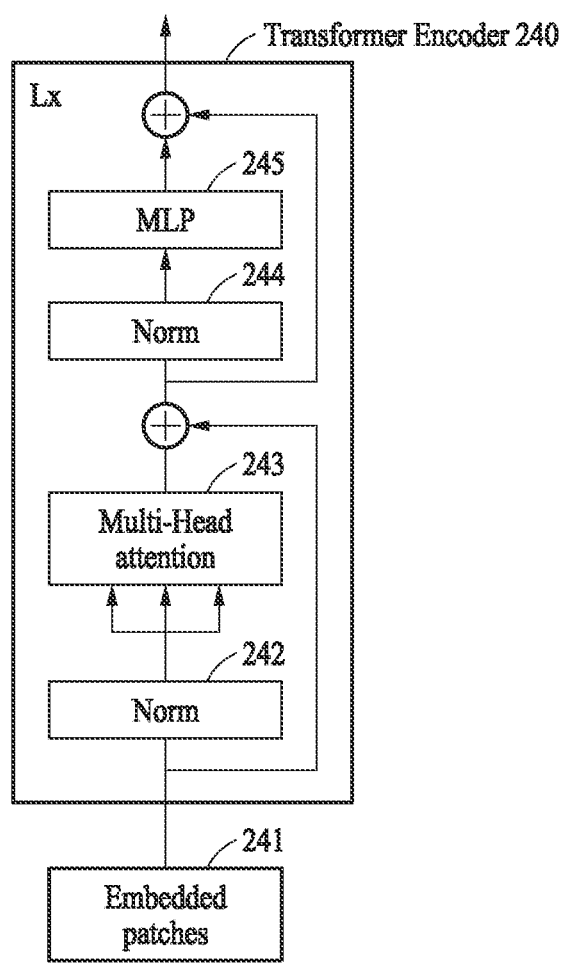

FIGS. 2A and 2B illustrate an example of a configuration of a transformer for image recognition. A transformer technology may also be used for image recognition. Image recognition may include various recognition technologies, such as, for example, object classification, object detection, object tracking, object recognition, and object authentication. Referring to FIG. 2A, a transformer model 200 may include a linear projection block 210, a transformer encoder 220, and a multi-layer perceptron (MLP) 230. An input image 201 may be divided into a plurality of patches, and the patches may be flattened. The flattened patches may constitute sequence data.

The linear projection block 210 may project the flattened patches to embedding vectors. Position information 0 through 9 may be respectively assigned to the embedding vectors, and embedding pairs 202 may thereby be determined. Here, position information may indicate a position of each of the patches respectively corresponding to the embedding vectors in the input image 201. The transformer encoder 220 may perform self-attention on the embedding pairs 202, and the MLP 230 may output a class 203 of the input image 201 based on an attention result. The MLP 230 may include a fully-connected layer.

Referring to FIG. 2B, a transformer encoder 240 may include a multi-head attention block 243, normalization blocks 242 and 244, and an MLP 245. The transformer encoder 240 may have a similar configuration to that of the encoders 110 of FIG. 1A, and perform an operation corresponding to an operation performed by the encoders 110. An encoding operation may be repeated L times. The transformer encoder 240 may correspond to the transformer encoder 220 of FIG. 2A. The multi-head attention block 243 may perform self-attention based on embedded patches 241, in a similar or same way the multi-head attention block 131 of FIG. 1B does.

When the size of the transformer model 200 increases, it may exhibit a similar level of performance to that of a convolution network. In image recognition, a recognition result may be affected more by spatial information than by long-term dependency. In image recognition, using global information and local information may improve the accuracy of the recognition result. Although, when a transformer technology is applied to image recognition, while the global information may be retained through self-attention, the local information may be lost because a typical transformer technology may use a fully-connected layer in lieu of a convolution layer.

Figure 3:
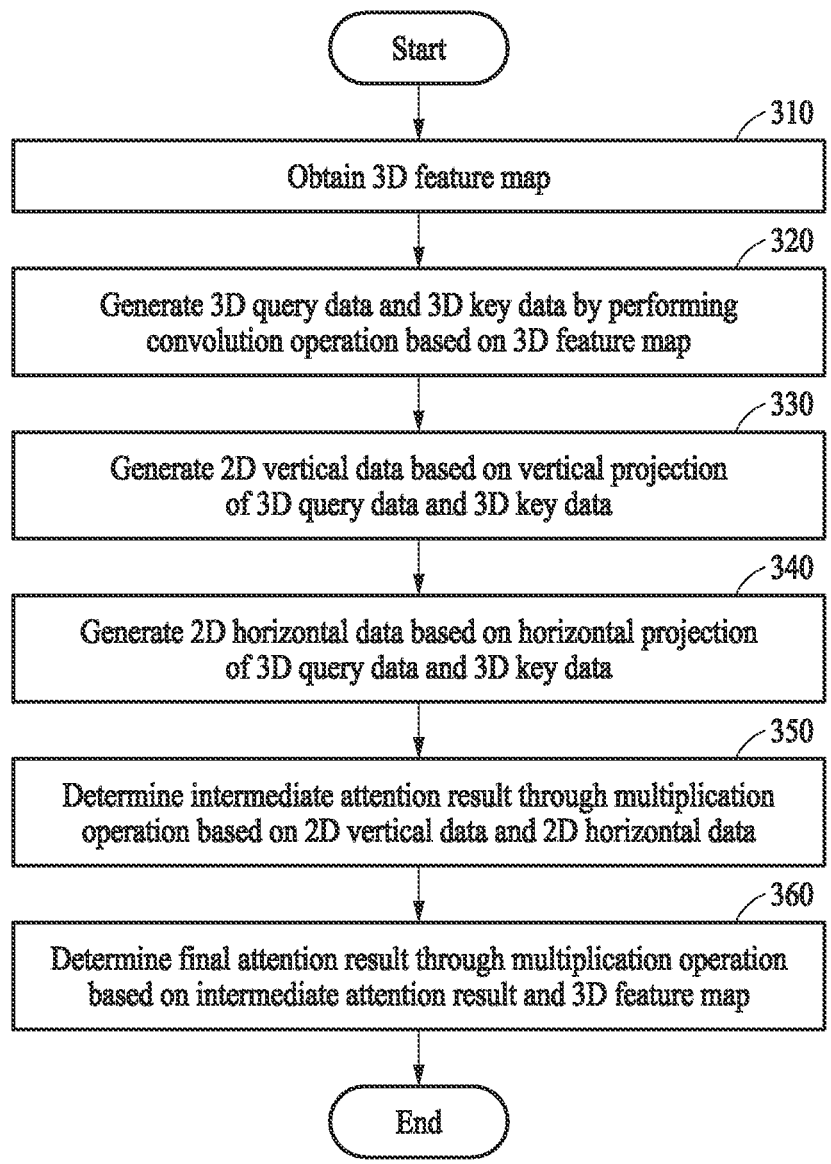
FIG. 3 illustrates an example of a self-attention method for image recognition.

FIG. 3 illustrates an example of a self-attention method for image recognition. Referring to FIG. 3, in operation 310, an image recognition apparatus may obtain a three-dimensional (3D) feature map. The image recognition apparatus may perform self-attention using a self-attention block of a neural network-based image recognition model. The 3D feature map may correspond to an input image of the image recognition model or output data of a convolution layer positioned before the self-attention block in the image recognition model. 3D data such as the 3D feature map may be represented by a channel dimension, a height dimension, and a width dimension. Two-dimensional (2D) data may be represented by two of these dimensions, for example, the channel dimension and the height dimension, or the channel dimension and the width dimension, and the like.

A neural network may correspond to a deep neural network (DNN) including a plurality of layers. The layers may include an input layer, one or more hidden layers, and an output layer.

The DNN may include at least one of a fully-connected network (FCN), a convolutional neural network (CNN), and a recurrent neural network (RNN). For example, at least a portion of the layers of the neural network may correspond to the CNN, and another portion of the layers of the neural network may correspond to the FCN. In this example, the CNN may be referred to as a convolution layer, and the FCN may be referred to as a fully-connected layer.

In the case of the CNN, data input to each layer may be referred to as an input feature map, and data output from each layer may be referred to as an output feature map. The input feature map and the output feature map may also be referred to as activation data. When the convolution layer is the input layer, an input feature map of the input layer may be an input image.

After being trained based on deep learning, the neural network may accurately perform an inference corresponding to the purpose of training by mapping input data and output data that are in a nonlinear relationship to each other. Deep learning may be a machine learning scheme used to solve a task, such as, for example, image or voice recognition, from a big data set. Deep learning may be construed as a process of solving an optimization problem to find a point at which energy is minimized while training the neural network using given training data.

In deep learning, supervised or unsupervised learning may be applied to obtain a configuration or structure of the neural network or a weight corresponding a model, and this weight may be used to map the input data and the output data to each other. When the width and depth of the neural network are sufficiently great, it may have a capacity suitable to implement a function. When the neural network learns a sufficient amount of training data through a desirable training process, it may obtain an optimal level of performance.

Hereinafter, the neural network will be represented as being trained in advance or pre-trained. The expression "trained in advance" or "pre-trained" may indicate a time before the neural network "starts." That the neural network "starts" may indicate that the neural network is ready to perform an inference as a result of training that has been performed. That the neural network "starts" may include, for example, when the neural network is loaded in a memory, or when input data for an inference is input to the neural network after the neural network is loaded in the memory.

In operation 320, the image recognition apparatus may generate 3D query data and 3D key data by performing a convolution operation based on the 3D feature map. The image recognition apparatus may generate the 3D query data through a first convolution operation based on the 3D feature map and a first weight kernel, and generate the 3D key data through a second convolution operation based on the 3D feature map and a second weight kernel. The first convolution operation may be performed through a first convolution layer based on the first weight kernel, and the second convolution operation may be performed through a second convolution layer based on the second weight kernel. The first convolution layer and the second convolution layer may constitute a portion of the image recognition model, and may be trained when the image recognition model is trained.

In operation 330, the image recognition apparatus may generate 2D vertical data based on a vertical projection of the 3D query data and the 3D key data. The image recognition apparatus may generate 2D vertical query data by performing a vertical projection on the 3D query data, and generate 2D vertical key data by performing a vertical projection on the 3D key data. The 3D query data and the 3D key data may each have the size of C*H*W, and the 2D vertical query data and the 2D vertical key data may each have the size of C*H.

The vertical projection may average data of the width dimension. For example, 3D data of C*H*W may be present. In this example, C denotes the number of pixels (or elements) in the channel dimension, H denotes the number of pixels in the height dimension, and W denotes the number of pixels in the width dimension. On a 2D plane of the channel dimension and the height dimension, C*H pixels may be present, and W pixels may be present in the width dimension for each of C*H pixels.

The image recognition apparatus may determine a multiplication result by performing a multiplication based on the 2D vertical query data and the 2D vertical key data. The multiplication may correspond to a matrix multiplication, and the multiplication result may have the size of C*H*H. The image recognition apparatus may generate the 2D vertical data by performing a projection on the multiplication result. The projection may be a vertical projection or a horizontal projection, and the 2D vertical data may have the size of C*H.

In operation 340, the image recognition apparatus may generate 2D horizontal data based on a horizontal projection of the 3D query data and the 3D key data. The image recognition apparatus may generate 2D horizontal query data by performing a horizontal projection on the 3D query data, and generate 2D horizontal key data by performing a horizontal projection on the 3D key data. The 2D horizontal query data and the 2D horizontal key data may each have the size of C*W.

The horizontal projection may average data of the height dimension. For example, when 3D data of C*H*W is present, C*W pixels may be present on a 2D plane of the channel dimension and the width dimension, and H pixels may be present in the height dimension for each of the C*W pixels. In this example, the horizontal projection may determine, to be a pixel value of each of the C*W pixels, an average value of the H pixels corresponding to each of the C*W pixels.

The image recognition apparatus may determine a multiplication result by performing a multiplication based on the 2D horizontal query data and the 2D horizontal key data. In this case, the multiplication may correspond to a matrix multiplication, and the multiplication result may have the size of C*W*W. The image recognition apparatus may generate the 2D horizontal data by performing a projection on the multiplication result. The projection may be vertical projection or horizontal projection, and the 2D horizontal data may have the size of C*W.

In operation 350, the image recognition apparatus may determine an intermediate attention result through a multiplication based on the 2D vertical data and the 2D horizontal data. The multiplication may correspond to a matrix multiplication, and the intermediate attention result may have the size of C*H*W. That is, the intermediate attention result may be generated based on the query data and the key data, and the query data, the key data, and the intermediate attention result may all have the size of C*H*W.

In operation 360, the image recognition apparatus may determine a final attention result through a multiplication based on the intermediate attention result and the 3D feature map. The 3D feature map may correspond to 3D value data of self-attention. The image recognition apparatus may perform a normalization on the intermediate attention result, and determine the final attention result through a multiplication based on a result of the normalization and the 3D feature map. The normalization may be performed based on a softmax operation, and the multiplication may correspond to a pixelwise multiplication. The final attention result may have the size of C*H*W. The image recognition apparatus may determine a recognition result of the image recognition model based on the final attention result.

Figure 4:
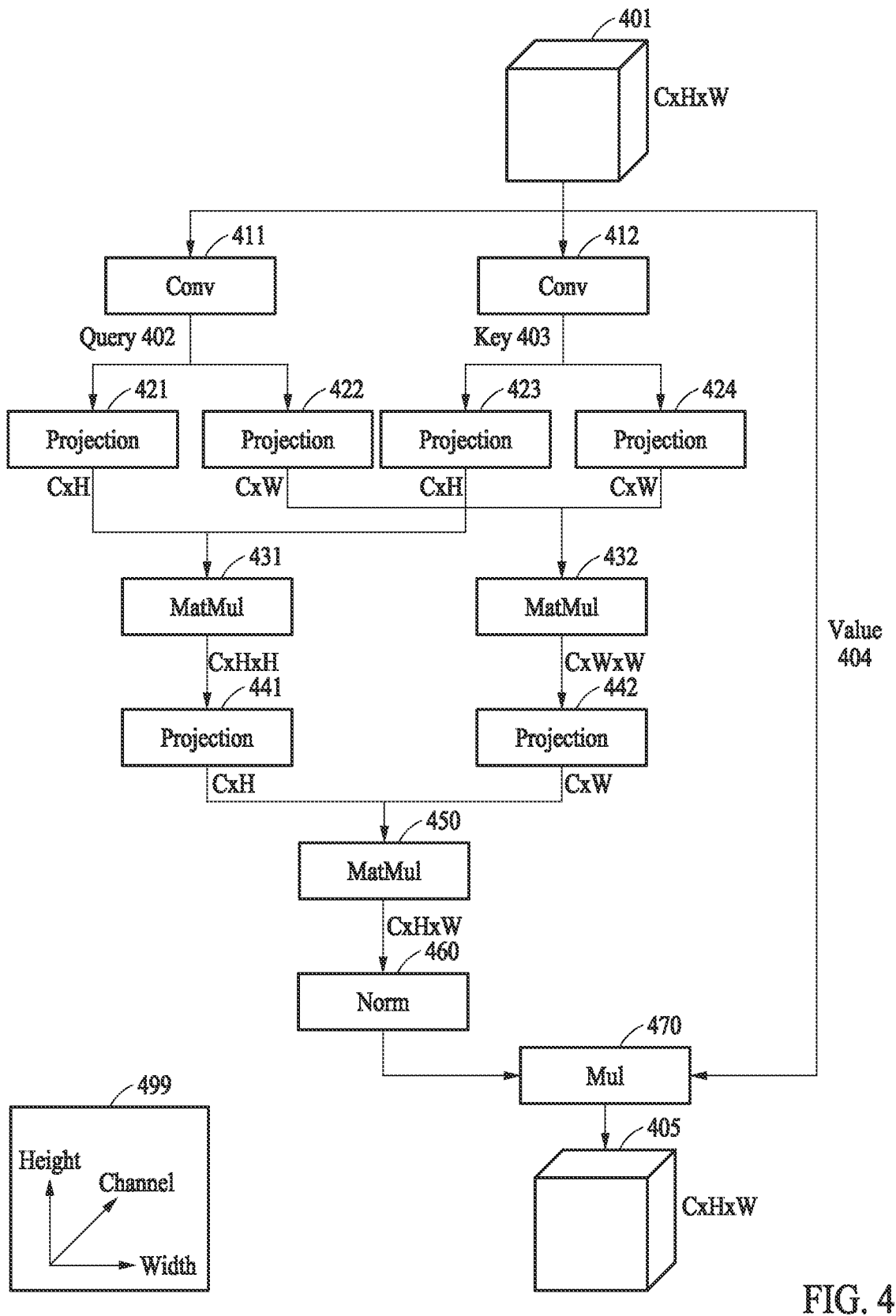
FIG. 4 illustrates a detailed example of self-attention.

FIG. 4 illustrates a detailed example of self-attention. Referring to FIG. 4, an image recognition apparatus may perform a first convolution operation 411 and a second convolution operation 412 based on a 3D feature map 401 of C*H*W. In an example 499, C indicates a channel direction, H indicates a height direction, and W indicates a width direction. The first convolution operation 411 and the second convolution operation 412 may be performed through a kernel of various sizes, for example, 1*1 convolution and 3*3 convolution. 3D query data 402 may be generated through the first convolution operation 411, and 3D key data 403 may be generated through the 2D convolution operation 412. The query data 402 and the key data 403 may each have the size of C*H*W.

The image recognition apparatus may perform projections 421 through 424 based on the query data 402 and the key data 403. The projections 421 and 423 may be a vertical projection.

As a result of the projections 421 and 423, 2D vertical query data and 2D vertical key data each having the size of C*H may be generated. The projections 422 and 424 may be a horizontal projection. As a result of the projections 422 and 424, 2D horizontal query data and 2D horizontal key data each having the size of C*W may be generated.

The image recognition apparatus may perform a matrix multiplication 431 based on the vertical query data and the vertical key data, and perform a projection 441 based on a multiplication result. The size of the multiplication result may be C*H*H, and the size of a projection result may be C*H. The projection result may also be referred to as 2D vertical data. The image recognition apparatus may perform a matrix multiplication 432 based on the horizontal query data and the horizontal key data, and perform a projection 442 based on a multiplication result. The size of the multiplication result may be C*W*W, and the size of a projection result may be C*W. The projection result may also be referred to as 2D horizontal data.

The image recognition apparatus may perform a matrix multiplication 450 based on the vertical data and the horizontal data. A multiplication result obtained therefrom may have the size of C*H*W, and may also be referred to as an intermediate attention result. The image recognition apparatus may perform a normalization 460 based on the multiplication result. For example, the normalization 460 may correspond to a softmax operation. The image recognition apparatus may perform a pixelwise multiplication 470 based on a normalization result of C*H*W and the feature map 401 of C*H*W. The feature map 401 may be used as 3D value data 404. A multiplication result may have the size of C*H*W, and correspond to a final attention result 405.

Figure 5:
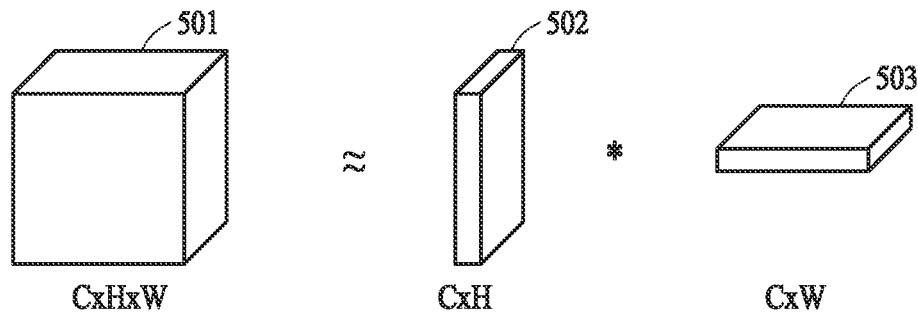
FIG. 5 illustrates an example of a relationship between three-dimensional (3D) data and a two-dimensional (2D) projection result.

FIG. 5 illustrates an example of a relationship between 3D data and a 2D projection result. Referring to FIG. 5, 2D vertical data 502 may correspond to a result of a vertical projection of 3D data 501, and 2D horizontal data 503 may correspond to a result of a horizontal projection of the 3D data 501. The 3D data 501 may correspond to a result of a multiplication between the 2D vertical data 502 and the 2D horizontal data 503. This relationship may be represented by Equation 1 below, for example.

$$\begin{bmatrix} a_{11} & \cdots & a_{1m} \\ \vdots & \ddots & \vdots \\ a_{n1} & \cdots & a_{nm} \end{bmatrix} \approx \begin{bmatrix} b_1 \\ \vdots \\ b_n \end{bmatrix} \begin{bmatrix} c_1 & \cdots & c_m \end{bmatrix} \quad \text{Equation 1}$$

In Equation 1 above, $a_{nm}$ denotes a vector of each channel of the 3D data 501, $b_n$ denotes a vector of each channel of the 2D vertical data 502, and $c_m$ denotes a vector of each channel of the 2D horizontal data 503. However, $a_{nm}$, $b_n$, and $c_m$ may also correspond to a pixel (or an element) of one channel. Here, n denotes a vertical direction, and m denotes a horizontal direction index. When a vertical projection corresponds to averaging of data of a width direction and a horizontal projection corresponds to averaging of data of a height direction, $b_n$ and $c_m$ may be represented by Equation 2 and Equation 3, respectively, for example.

$$b_n = \frac{1}{m}\sum_{i=1}^{m} a_{ni} \quad \text{Equation 2}$$

$$c_m = \frac{1}{n}\sum_{i=1}^{n} a_{mi} \quad \text{Equation 3}$$

Thus, the 3D data 501 may be transformed into the 2D vertical data 502 and the 2D horizontal data 503 with a minimum information loss through an averaging-based projection.

Figure 6A:
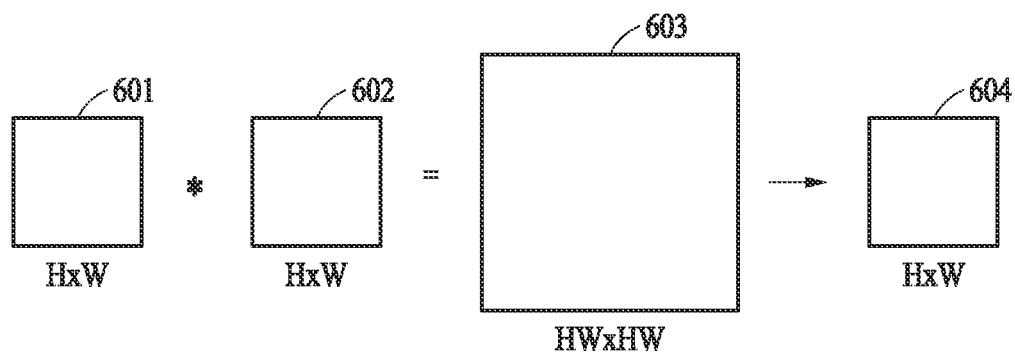
FIGS. 6A and 6B illustrate an example of reducing an amount of computation through a projection.
Figure 6B:
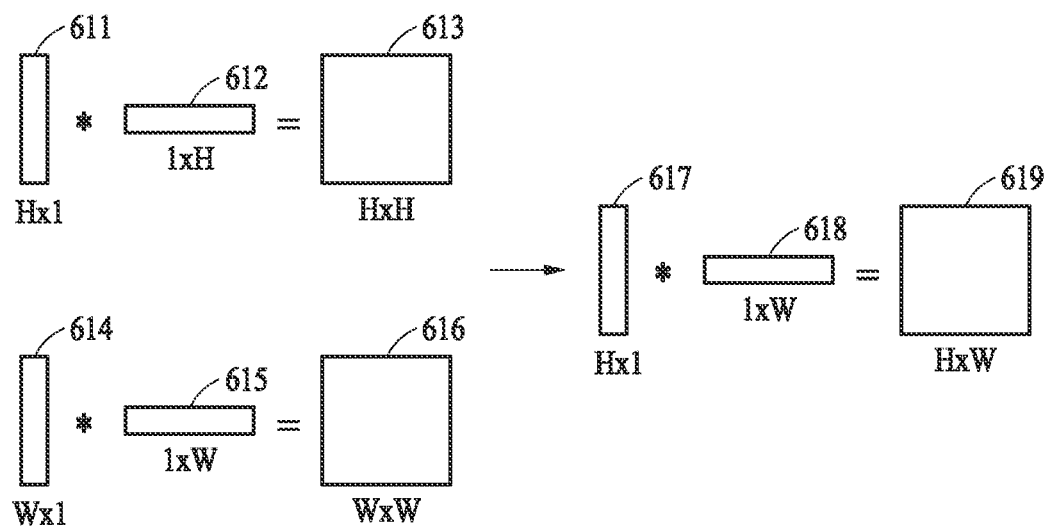

FIGS. 6A and 6B illustrate an example of reducing the amount of computation through a projection. FIG. 6A illustrates an example using a projection, and FIG. 6B illustrates an example not using a projection. Referring to FIG. 6A, a multiplication result 603 of HW*HW may be derived through a multiplication between input data 601 of H*W and input data 602 of H*W, and the multiplication result 603 may be transformed into output data 604 of H*W. The amount of computation may be represented by $H^2W^2+HW$ when a projection is used for the transformation, and be represented by $H^2W^2+H^2W^2$ when a matrix multiplication is used for the transformation.

Referring to FIG. 6B, the input data 601 may be replaced with projected data 611 of H*1 and projected data 614 of W*1, and the input data 602 may be replaced with projected data 612 of 1*H and projected data 615 of 1*W. A multiplication result 613 of H*H may be derived through a multiplication between the projected data 611 and the projected data 612, and a multiplication result 616 of W*W may be derived through a multiplication between the projected data 614 and the projected data 615. The multiplication result 613 may be projected to vertical data 617 of H*1, and the multiplication result 616 may be projected to horizontal data 618 of 1*W. Through a multiplication between the vertical data 617 and the horizontal data 618, output data 619 of H*W may be determined. In this case, the amount of computation may be represented by $H^2+W^2+HW+2H+2W$, which may be a value smaller than a value obtained when a projection is not used. Accordingly, a self-attention method and apparatus of one or more embodiments may improve the technical field of self-attention by reducing an amount of computation used.

Figure 7A:
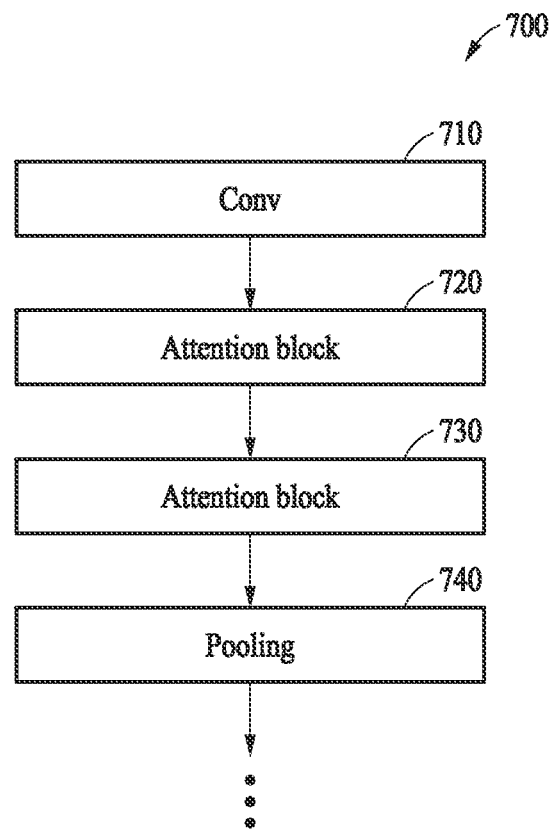
FIGS. 7A and 7B illustrate an example of a neural network model including an attention block.
Figure 7B:
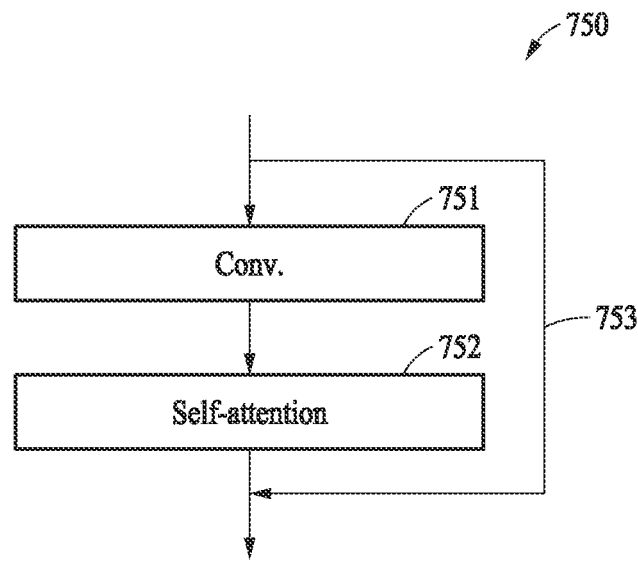

FIGS. 7A and 7B illustrate an example of a neural network model including an attention block. Referring to FIG. 7A, a neural network model 700 may include a convolution layer 710, attention blocks 720 and 730, and a pooling layer 740. For example, the convolution layer 710 may perform a 3*3 convolution operation, and may correspond to an S2 layer. Referring to FIG. 7B, an attention block 750 may include a convolution layer 751 and a self-attention block 752. The attention block 750 may correspond to the attention blocks 720 and 730 of FIG. 7A. For example, the convolution layer 751 may perform a 3*3 convolution operation. In the self-attention block 752, self-attention described herein may be performed. A self-attention result may be applied (e.g., through a pixelwise addition or concatenation) to a residual through a skip connection 753. For example, the residual may correspond to an output feature map of a convolution layer (e.g., the convolution layer 710) disposed before the attention block 750. Subsequently, a recognition result based on a result of the applying may be derived.

Figure 8:
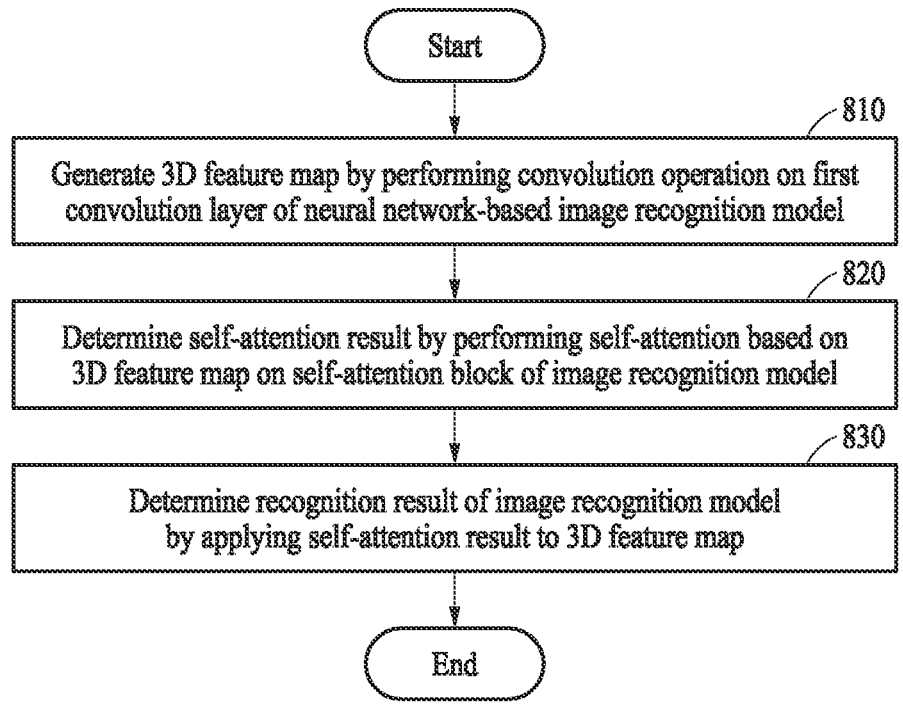
FIG. 8 illustrates an example of an image recognition method using self-attention.

FIG. 8 illustrates an example of an image recognition method using self-attention. Referring to FIG. 8, in operation 810, an image recognition apparatus may generate a 3D feature map by performing a convolution operation for a first convolution layer of a neural network-based image recognition model. In operation 820, the image recognition apparatus may determine a self-attention result by performing self-attention based on the 3D feature map for a self-attention block of the image recognition model. In operation 830, the image recognition apparatus may determine a recognition result of the image recognition model by applying the self-attention result to the 3D feature map. For a detailed description of the image recognition method, reference may be made to what is described herein with reference to FIGS. 1 through 7, and 9 and 10.

Figure 9:
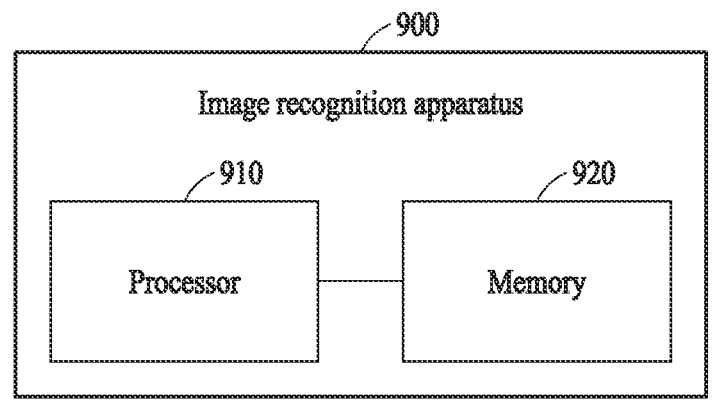
FIG. 9 illustrates an example of an image recognition apparatus.

FIG. 9 illustrates an example of an image recognition apparatus. Referring to FIG. 9, an image recognition apparatus 900 may include a processor 910 (e.g., one or more processors) and a memory 920 (e.g., one or more memories). The memory 920 may be connected to the processor 910, and store therein instructions executable by the processor 910 and data to be processed by the processor 910 or data processed by the processor 910. The memory 920 may include, as non-limiting examples, a non-transitory computer-readable medium, for example, a high-speed random-access memory (RAM) and/or a nonvolatile computer-readable medium (e.g., one or more disk storage devices, flash memory devices, or other nonvolatile solid-state memory devices).

The processor 910 may execute instructions to perform one or more of the operations or methods described herein with reference to FIGS. 1 through 8, and 10. For example, the processor 910 may obtain a 3D feature map, generate 3D query data and 3D key data by performing a convolution operation based on the 3D feature map, generate 2D vertical data based on a vertical projection of the 3D query data and the 3D key data, generate 2D horizontal data based on a horizontal projection of the 3D query data and the 3D key data, determine an intermediate attention result through a multiplication based on the 2D vertical data and the 2D horizontal data, and determine a final attention result through a multiplication based on the intermediate attention result and the 3D feature map. For a detailed description of the image recognition apparatus 900, reference may be made to what is described herein with reference to FIGS. 1 through 8, and 10.

Figure 10:
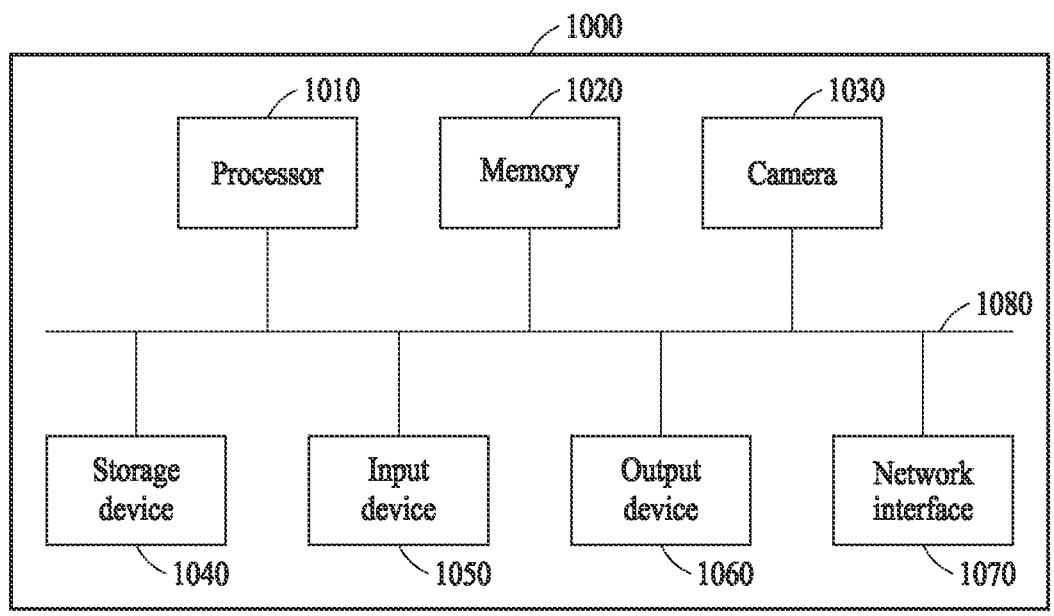
FIG. 10 illustrates an example of an electronic device.

FIG. 10 illustrates an example of an electronic device. Referring to FIG. 10, an electronic device 1000 may include a processor 1010 (e.g., one or more processors), a memory 1020 (e.g., one or more memories), a camera 1030, a storage device 1040, an input device 1050, an output device 1060, and a network interface 1070, and these components may communicate with one another through a communication bus 1080. For example, the electronic device 1000 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., an autonomous vehicle, a smart vehicle, etc.). The electronic device 1000 may structurally and/or functionally include the image recognition apparatus 900 of FIG. 9.

The processor 1010 may execute instructions and/or functions to be executed in the electronic device 1000. For example, the processor 1010 may process instructions stored in the memory 1020 or the storage device 1040. The processor 1010 may perform one or more, or all, of the operations or methods described above with reference to FIGS. 1 through 9. The memory 1020 may include a computer-readable storage medium or a computer-readable storage device. The memory 1020 may store instructions to be executed by the processor 1010, and may store related information while software and/or applications are being executed by the electronic device 1000.

The camera 1030 may capture an image and/or video. The storage device 1040 may include a computer-readable storage medium or a computer-readable storage device. The storage device 1040 may store a greater amount of information than the memory 1020 and store the information for a long period of time. The storage device 1040 may include, as non-limiting examples, a magnetic hard disk, an optical disc, a flash memory, a floppy disk, or any other type of nonvolatile memory that is well-known in the art.

The input device 1050 may receive an input from a user through a traditional input method using a keyboard and a mouse, or a new input method using, for example, a touch input, a voice input, and an image input. The input device 1050 may include, as non-limiting examples, a keyboard, a mouse, a touchscreen, a microphone, or any other device that detects an input from a user and transmits the detected input to the electronic device 1000. The output device 1060 may provide an output of the electronic device 1000 to a user through a visual, auditory, or tactile channel. The output device 1060 may include, as non-limiting examples, a display, a touchscreen, a speaker, a vibration generating device, or any other device that provides an output of the electronic device 1000 to a user. The network interface 1070 may communicate with an external device through a wired or wireless network.

The image recognition apparatuses, processors, memories, electronic devices, cameras, storage devices, input devices, output devices, network interfaces, communication buses, image recognition apparatus 900, processor 910, memory 920, electronic device 1000, processor 1010, memory 1020, camera 1030, storage device 1040, input device 1050, output device 1060, network interface 1070, communication bus 1080, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with self-attention, comprising:
    generating three-dimensional (3D) query data and 3D key data by performing a convolution operation based on a 3D feature map;
    generating two-dimensional (2D) vertical data based on an averaging based vertical projection of the generated 3D query data and the generated 3D key data;
    generating 2D horizontal data based on an averaging-based horizontal projection of the generated 3D query data and the generated 3D key data;
    generating an intermediate attention result through a multiplication based on the generated 2D vertical data and the generated 2D horizontal data;
    generating a final attention result through a multiplication based on the generated intermediate attention result and the 3D feature map; and
    applying the generated final attention result to the 3D feature map.

2. The method of claim 1, wherein
    the 3D feature map, the generated 3D query data, and the generated 3D key data are each represented by a channel dimension, a height dimension, and a width dimension,
    the generated 2D vertical data is represented by the channel dimension and the height dimension without the width dimension, and
    the generated 2D horizontal data is represented by the channel dimension and the width dimension without the height dimension.

3. The method of claim 2, wherein
    the averaging-based vertical projection averages data of the width dimension, and
    the averaging-based horizontal projection averages data of the height dimension.

4. The method of claim 1, wherein the generating of the 3D query data and the 3D key data comprises:
    generating the 3D query data through a convolution operation based on the 3D feature map and a first weight kernel; and
    generating the 3D key data through a convolution operation based on the 3D feature map and a second weight kernel.

5. The method of claim 1, wherein the generating of the 2D vertical data comprises:
    generating 2D vertical query data by performing an averaging-based vertical projection on the generated 3D query data;
    generating 2D vertical key data by performing an averaging-based vertical projection on the generated 3D key data;
    determining a multiplication result by performing a multiplication based on the generated 2D vertical query data and the generated 2D vertical key data; and
    generating the 2D vertical data by performing a projection on the multiplication result.

6. The method of claim 1, wherein the generating of the 2D horizontal data comprises:
    generating 2D horizontal query data by performing an averaging-based horizontal projection on the generated 3D query data;
    generating 2D horizontal key data by performing an averaging horizontal projection on the generated 3D key data;
    determining a multiplication result by performing a multiplication based on the generated 2D horizontal query data and the generated 2D horizontal key data; and
    generating the 2D horizontal data by performing a projection on the multiplication result.

7. The method of claim 1, wherein the 3D feature map used for determining the final attention result corresponds to 3D value data.

8. The self-attention method of claim 1, wherein the determining of the final attention result comprises:
    performing a normalization on the intermediate attention result; and
    determining the final attention result through a multiplication based on a result of the normalization and the 3D feature map.

9. The method of claim 8, wherein the normalization on the intermediate attention result is performed based on a softmax operation.

10. The method of claim 1, wherein
    the multiplication based on the generated 2D vertical data and the generated 2D horizontal data is a matrix multiplication, and the multiplication based on the intermediate attention result and the 3D feature map is a pixelwise multiplication.

11. The method of claim 1, wherein the obtaining of the 3D feature map, the generating of the 3D query data and the 3D key data, the generating of the 2D vertical data, the generating of the 2D horizontal data, the determining of the intermediate attention result, and the determining of the final attention result are performed for a self-attention block of a neural network-based image recognition model.

12. The method of claim 11, wherein the 3D feature map corresponds to either one of an input image of the image recognition model and output data of a convolution layer of the image recognition model.

13. The method of claim 11, wherein a recognition result of the image recognition model is determined based on the final attention result.

14. The method of claim 1, further comprising:
generating the 3D feature map by performing a convolution operation for a neural network-based image recognition model.

15. A method with image recognition, comprising:
generating a three-dimensional (3D) feature map by performing a convolution operation for a first convolution layer of a neural network-based image recognition model;
generating a self-attention result by performing self-attention based on the generated 3D feature map for a self-attention block of the image recognition model; and
determining a recognition result of the image recognition model by applying the generated self-attention result to the generated 3D feature map,
wherein the generating of the self-attention result comprises:
generating 3D query data and 3D key data by performing a convolution operation on the generated 3D feature map;
generating two-dimensional (2D) vertical data based on an averaging-based vertical projection of the generated 3D query data and the generated 3D key data;
generating 2D horizontal data based on an averaging-based horizontal projection of the generated 3D query data and the generated 3D key data;
generating an intermediate attention result through a multiplication based on the generated 2D vertical data and the generated 2D horizontal data; and
determining a final attention result through a multiplication based on the generated intermediate attention result and the generated 3D feature map.

16. The method of claim 15, wherein
the generated 3D feature map, the generated 3D query data, the generated 3D key data are each represented by a channel dimension, a height dimension, and a width dimension,
the generated 2D vertical data is represented by the channel dimension and the height dimension without the width dimension, and
the generated 2D horizontal data is represented by the channel dimension and the width dimension without the height dimension.

17. The method of claim 15, wherein the generating of the 3D query data and the 3D key data comprises:
generating the 3D query data through a convolution operation based on the generated 3D feature map and a first weight kernel; and
generating the 3D key data through a convolution operation based on the generated 3D feature map and a second weight kernel.

18. The method of claim 15, wherein the generating of the 2D vertical data comprises:
generating 2D vertical query data by performing an averaging-based vertical projection on the generated 3D query data;
generating 2D vertical key data by performing an averaging-based vertical projection on the generated 3D key data;
determining a multiplication result by performing a multiplication based on the generated 2D query data and the 2D key data; and
generating the 2D vertical data by performing a projection on the multiplication result.

19. A non-transitory computer-readable storage medium storing instructions that, when executed by a processor, configure the processor to perform the method of claim 15.

20. An electronic device comprising:
a processor configured to:
generate three-dimensional (3D) query data and 3D key data by performing a convolution operation based on a 3D feature map;
generate two-dimensional (2D) vertical data based on an averaging-based vertical projection of the generated 3D query data and the generated 3D key data;
generate 2D horizontal data based on an averaging-based horizontal projection of the generated 3D query data and the generated 3D key data;
generate an intermediate attention result through a multiplication based on the generated 2D vertical data and the generated 2D horizontal data;
generate a final attention result through a multiplication based on the generated intermediate attention result and the 3D feature map;
applying the generated final attention result to the 3D feature map.

21. The electronic device of claim 20, wherein
the 3D feature map, the generated 3D query data, and the generated 3D key data are each represented by a channel dimension, a height dimension, and a width dimension,
the generated 2D vertical data is represented by the channel dimension and the height dimension without the width dimension, and
the generated 2D horizontal data is represented by the channel dimension and the width dimension without the height dimension.

22. The electronic device of claim 20, further comprising a memory storing instructions that, when executed by the processor, configure the processor to perform an obtaining of the 3D feature map, the generating of the 3D query data and the 3D key data, the generating of the 2D vertical data, the generating of the 2D horizontal data, the determining of the intermediate attention result, and the determining of the final attention result.

23. A method with self-attention, comprising:
generating three-dimensional (3D) query data and 3D key data by performing a convolution operation based on a 3D feature map;
generating first two-dimensional (2D) data based on averages of the generated 3D query data and the generated 3D key data in a first dimension direction;
generating second 2D data based on averages of the generated 3D query data and the generated 3D key data in a second dimension direction;

generating a final attention result based on the generated first 2D data and the generated second 2D data; and applying the generated final attention result to the generated 3D feature map.

24. The method of claim 23, wherein the generated first 2D data comprises an averaging-based projection of the generated 3D query data and the generated 3D key data in a direction of any one of a channel, a height, and a width, and the first dimension direction is a direction of any other one of the channel, the height, and the width.

25. The method of claim 23, wherein the generated final attention result is 3D and has a same size as the 3D feature map.

* * * * *